United States Patent
Cho et al.

(10) Patent No.: US 10,481,308 B2
(45) Date of Patent: Nov. 19, 2019

(54) OPTICAL FILM, METHOD FOR MANUFACTURING OPTICAL FILM, AND LIQUID CRYSTAL DISPLAY INCLUDING OPTICAL FILM

(71) Applicant: LG Display Co., Ltd., Seoul (KR)

(72) Inventors: Wonjong Cho, Seoul (KR); Sudong Roh, Seoul (KR); Daeheung Lee, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1 day.

(21) Appl. No.: 15/364,553

(22) Filed: Nov. 30, 2016

(65) Prior Publication Data
US 2017/0153362 A1     Jun. 1, 2017

(30) Foreign Application Priority Data
Nov. 30, 2015    (KR) .................. 10-2015-0168435

(51) Int. Cl.
*G02B 5/02*           (2006.01)
*G02F 1/1335*        (2006.01)
*G02B 5/30*           (2006.01)

(52) U.S. Cl.
CPC ......... *G02B 5/0242* (2013.01); *G02B 5/0226* (2013.01); *G02B 5/0231* (2013.01); *G02F 1/133504* (2013.01); *G02F 1/133528* (2013.01); *G02B 5/0221* (2013.01); *G02B 5/0268* (2013.01); *G02B 5/3025* (2013.01);
(Continued)

(58) Field of Classification Search
CPC ............... G02B 5/0242; G02F 2202/28; G02F 2001/133507; G02F 1/133528; G02F 1/133504
See application file for complete search history.

(56) References Cited

U.S. PATENT DOCUMENTS 6,324,011 B1 * 11/2001 Higuchi ................ G02B 5/124
                                            359/454
2002/0015123 A1 * 2/2002 Iwata ................... G02B 5/0221
                                            349/112

(Continued)

FOREIGN PATENT DOCUMENTS

| KR | 10-2009-0045550 A | 5/2009 |
| KR | 10-2009-0047485 A | 5/2009 |

(Continued)

OTHER PUBLICATIONS

Korean Office Action dated Oct. 17, 2017, for corresponding Korean patent application No. 10-2015-0168435.

(Continued)

*Primary Examiner* — Paisley L Arendt
*Assistant Examiner* — Mariam Qureshi
(74) *Attorney, Agent, or Firm* — Morgan, Lewis & Bockius LLP

(57) ABSTRACT

Provided are an optical film, a method for manufacturing an optical film, and a liquid crystal display. An optical film includes: a polarizer, a diffusion sheet adhered to a bottom surface of the polarizer, the diffusion sheet including: a first diffusion member, and a second diffusion member adhered to the first diffusion member, and a prism sheet adhered to a bottom surface of the diffusion sheet.

23 Claims, 20 Drawing Sheets

(52) U.S. Cl.
CPC ............ *G02F 2001/133507* (2013.01); *G02F 2202/28* (2013.01)

(56) References Cited

U.S. PATENT DOCUMENTS

| | | | |
|---|---|---|---|
| 2005/0046321 A1* | 3/2005 | Suga .................... | G02B 5/0226 313/112 |
| 2008/0049330 A1 | 2/2008 | Tolbert et al. | |
| 2008/0180599 A1* | 7/2008 | Ha ...................... | B29C 65/1406 349/64 |
| 2009/0021935 A1* | 1/2009 | Lin ...................... | G02B 5/0242 362/246 |
| 2009/0296028 A1* | 12/2009 | Lee ........................ | G02B 5/021 349/96 |
| 2010/0165466 A1* | 7/2010 | Endo ........................ | B32B 7/14 359/599 |
| 2011/0024928 A1* | 2/2011 | Laney .................. | G02B 5/0242 264/1.31 |
| 2011/0242141 A1* | 10/2011 | Yamakita ............... | G02B 3/005 345/690 |
| 2015/0109561 A1 | 4/2015 | Fuchida et al. | |
| 2015/0277012 A1 | 10/2015 | Nakamura et al. | |
| 2017/0322348 A1* | 11/2017 | Shimamura .......... | G02B 5/0231 |

FOREIGN PATENT DOCUMENTS

| | | |
|---|---|---|
| KR | 10-2011-0136645 A | 12/2011 |
| KR | 10-2014-0132409 A | 11/2014 |
| KR | 10-2015-0035636 A | 4/2015 |
| KR | 10-2015-0113907 A | 10/2015 |

OTHER PUBLICATIONS

Korean Office Action dated Apr. 17, 2018, issued in corresponding Korean Patent Application No. 10-2015-0168435.
Korean Office Action dated Jul. 16, 2018, issued in corresponding Korean Patent Application No. 10-2015-0168435.
Korean Office Action dated Oct. 8, 2018, issued in corresponding Korean Patent Application No. 10-2018-0110208.

* cited by examiner

OPTICAL FILM, METHOD FOR MANUFACTURING OPTICAL FILM, AND LIQUID CRYSTAL DISPLAY INCLUDING OPTICAL FILM

CROSS-REFERENCE TO RELATED APPLICATION(S)

This application claims the benefit of Korean Patent Application No. 10-2015-0168435, filed on Nov. 30, 2015, the entire disclosure of which is hereby incorporated by reference herein.

BACKGROUND

1. Technical Field

The present disclosure relates to a liquid crystal display having an optical film embedded therein and, more particularly, to a liquid crystal display having a structure in which an optical film for the uniformity and condensing of light provided by a backlight unit has been laminated on a lower polarizer.

2. Discussion of the Related Art

The application of a liquid crystal display has gradually increased due to its characteristics, such as light weight, a thin profile, and low power consumption. The liquid crystal display is used in portable computers, such as notebook PCs, office automation devices, audio/video devices, and indoor and outdoor advertising displays. A transmission-type liquid crystal display, used in most liquid crystal displays, can display an image by modulating light incident from a backlight unit through control of an electric field applied to a liquid crystal layer.

The backlight unit may be categorized as a direct type and an edge type. The direct-type backlight unit has a structure in which a plurality of light sources is disposed under a liquid crystal display panel. The edge-type backlight unit has a structure in which a light source is disposed to face the side of a light guide plate with a plurality of optical films disposed between a liquid crystal display panel and the light guide plate. In the edge-type backlight unit, the light source radiates light to one side of the light guide plate, and the light guide plate converts a line light source or a dot light source into a surface light source. The edge-type backlight unit has an advantage in that it can be made thinner than the direct-type backlight unit.

A liquid crystal display that includes an edge-type backlight unit according to a related art is described with reference to FIGS. 1 and 2. FIG. 1 is an exploded perspective view showing the structure of the liquid crystal display that includes an edge-type backlight unit according to the related art. FIG. 2 is a cross-sectional view showing the structure of the liquid crystal display that includes an edge-type backlight unit according to the related art, which is taken along line I-I' of FIG. 1.

With reference to FIGS. 1 and 2, the liquid crystal display according to the related art includes a liquid crystal display panel LCP and an edge-type backlight unit EBLU disposed under the liquid crystal display panel LCP. The liquid crystal display panel LCP has a liquid crystal layer LC formed between an upper glass substrate SU and a lower glass substrate SL, and may be implemented in any liquid crystal mode. The liquid crystal display panel LCP also has an upper polarizer UPOL on the upper glass substrate SU and a lower polarizer LPOL under the lower glass substrate SL.

The edge-type backlight unit EBLU includes a light source LS, a light guide plate LG, and an optical film OPT. The edge-type backlight unit EBLU converts light, output by the light source LS, into a uniform surface light source through the light guide plate LG and the optical film OPT, and provides the converted uniform surface light source to the liquid crystal display panel LCP. Furthermore, a reflection plate REF for returning light that leaks through the bottom of the light guide plate LG to the light guide plate LG may be further provided under the light guide plate LG.

A cover bottom CB is disposed under the reflection plate REF. The cover bottom CB may have a bowl or container shape in which the edge-type backlight unit EBLU is received. Furthermore, the cover bottom CB includes a material having high thermal conductivity and high stiffness so that heat from the light source LS can be smoothly discharged to the outside. For example, the cover bottom CB may be formed using a metal plate, such as aluminum (Al), aluminum nitride (AlN), an electronic galvanized steel sheet (EGI), stainless steel (SUS), Galvalume (SGLC), an aluminized steel sheet (so-called "ALCOSTA"), or a tin plate steel sheet (SPTE). Furthermore, the metal plate may be coated with a high conductivity material for accelerating thermal transfer.

A guide panel GP and the top case TC are disposed at the edge of the liquid crystal display panel LCP. The guide panel GP has a rectangular mold frame in which glass fiber is mixed in synthetic resin, such as polycarbonate. The guide panel GP surrounds the top edge and sides of the liquid crystal display panel LCP and surrounds the sides of the edge-type backlight unit EBLU. The guide panel GP supports the liquid crystal display panel LCP and maintains a uniform spacing between the liquid crystal display panel LCP and the optical film OPT. The top case TC is made of a metal material, such as a zinc plate steel sheet, and has a structure that surrounds the top and sides of the guide panel GP. The top case TC is fixed to at least one of the guide panel GP and the cover bottom CB by a hook or a screw.

A light-emitting device having high brightness with low power consumption, like a light-emitting diode (LED), may be used as the light source LS. The light source LS supplies light to the light guide plate LG. In the edge-type backlight unit EBLU, the light source LS is located at the side of the liquid crystal display panel LCP. That is, the light source LS supplies light to a side of the light guide plate LG in accordance with at least one side of the light guide plate LG.

The light guide plate LG has a panel type rectangular parallelepiped shape having a face corresponding to the area of the liquid crystal display panel LCP. The top surface of the light guide plate LG faces the liquid crystal display panel LCP. The light guide plate LG functions to receive light from the light source LS installed on the side of the light guide plate LG, to diffuse and distribute the light therein so that the light is uniformly distributed within the light guide plate LG, and to guide the light to the top surface on which the liquid crystal display panel LCP has been disposed.

The light guided to the liquid crystal display panel LCP by the light guide plate LG is not suitable for being used as a backlight. For example, the light may not have a uniform brightness distribution over the entire area of the liquid crystal display panel LCP. Alternatively, the light may not have been concentrated in the direction of a viewer with respect to a surface of the liquid crystal display panel LCP. Accordingly, for the light to be used as a backlight, it is necessary to concentrate and diffuse the light in particular locations.

For such a function, the optical film OPT is disposed between the light guide plate LG and the liquid crystal display panel LCP. The structure of the optical films OPT according to a related art is described below with reference to FIGS. 3-4. FIG. 3 is a cross-sectional view showing the structure of optical films, including a diffusion film, in a liquid crystal display according to a related art.

The optical films OPT disposed under the liquid crystal display panel LCP of FIG. 3 have a stack structure that is widely used. For example, the optical films OPT may have a structure in which a lower prism sheet PRL, an upper prism sheet PRU, and a diffusion sheet DIF have been sequentially stacked.

Trigonal prism patterns are disposed in parallel on the top surface of the lower prism sheet PRL. More specifically, a convex peak portion and a concave valley portion are alternately disposed on the lower prism sheet PRL. Pointed peak portions are arranged in parallel in a first direction. The upper prism sheet PRU may also have the same prism pattern as the lower prism sheet PRL. In this case, the tops of the upper prism sheet PRU are disposed in parallel in a second direction orthogonal to the first direction. Light emitted from the light guide plate LG is concentrated in the form of a Gaussian distribution with respect to a normal line for the surface of the liquid crystal display panel LCP, while passing through the lower prism sheet PRL and the upper prism sheet PRU.

The diffusion sheet DIF functions to distribute pieces of light passing through the prism sheets PRL and RPU so that the pieces of light have a uniform brightness distribution over the entire surface of the liquid crystal display panel LCP. For example, in the case of the edge-type backlight unit, a side face in which the light source is positioned may be brighter than a side face opposite the side face in which the light source is positioned. Furthermore, in the case of the direct-type backlight unit, a portion in which the light source is positioned may be brighter than the surrounding portion of the light source. The diffusion sheet DIF functions to uniformly diffuse a brightness distribution of light that is not uniform with respect to the entire surface of the liquid crystal display panel LCP. For such a diffusion function, beads BD may have been distributed on the top surface of the diffusion sheet DIF.

Light becomes suitable for being used as backlight by the prism sheets PRL and RPU and the diffusion sheet DIF, but there may be a problem in that brightness is deteriorated while the light passes through the optical films. This becomes a reason for deteriorating energy efficiency required to generate the backlight. More specifically, brightness is significantly reduced by the diffusion sheet DIF. To solve such a problem, there has been proposed a high brightness diffusion film DBEF. FIG. 4 is a cross-sectional view showing the structure of optical films including a high brightness diffusion film DBEF in a liquid crystal display according to a related art.

The high brightness diffusion film DBEF has a high refraction layer and a low refraction layer stacked thereon. This solves a problem in that brightness is reduced by reflecting light lost by reflection to its top surface again. FIG. 4 has the same structure as FIG. 3, except that the high brightness diffusion film DBEF has been disposed instead of the diffusion film DIF.

As described above, the optical films according to a related art have a structure in which they have been sequentially stacked between the liquid crystal display panel LCP and the light guide plate LG. That is, the upper prism sheet PRU is disposed on the lower prism sheet PRL in the lay-down state. Accordingly, a specific air layer is present between the upper prism sheet PRU and the lower prism sheet PRL. The air layer has a refractive index different from that of the prism sheets PRL and RPU. Thus, an effect can be obtained in that light passing through the prism sheets PRL and RPU is diffused.

Likewise, the diffusion film DIF or the high brightness diffusion film DBEF is also disposed on the upper prism sheet PRU in the lay-down state. Accordingly, an air layer is present between the upper prism sheet PRU and the diffusion film DIF or between the upper prism sheet PRU and the high brightness diffusion film DBEF. Thus, an effect can be obtained in that light is diffused while passing through the air layers.

However, thickness of the device is increased due to the structure in which the optical films OPT are simply stacked, which becomes an obstacle to the desired thinness of a liquid crystal display. An attempt has been made to make the optical films OPT ultra-thin by laminating them. However, if the optical films OPT are simply laminated, a diffusion effect by using an air layer cannot be obtained because the air layer disappears, resulting in an irregular brightness distribution. Furthermore, a moiré pattern, a rainbow mura pattern, or a pattern of a hot-spot form is generated. Defects, such as irregular brightness, pattern generation, light bleeding failure, etc. are seen as being deficient enough that light cannot be suitably used as backlight, preventing a liquid crystal display from becoming ultra-thin.

SUMMARY

Accordingly, the present disclosure is directed to an optical film, a method for manufacturing an optical film, and a liquid crystal display including an optical film that substantially obviate one or more of the problems due to limitations and disadvantages of the related art.

An object of the present disclosure is to provide an ultra-thin liquid crystal display with which an optical film has been integrated. Another object of the present disclosure is to provide a liquid crystal display capable of preventing an LCD panel from being bent by matching a contractile power between optical films adhered to the top and bottom surfaces of the liquid crystal display.

Another embodiment of the present disclosure is directed to the provision of an ultra-thin liquid crystal display with which an optical film has been integrated by laminating a lower polarizer, a support sheet, and a prism sheet.

Additional features and advantages will be set forth in the description which follows, and in part will be apparent from the description, or may be learned by practice of the invention. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, there is provided an optical film, including: a polarizer, a diffusion sheet adhered to a bottom surface of the polarizer, the diffusion sheet including: a first diffusion member, and a second diffusion member adhered to the first diffusion member, and a prism sheet adhered to a bottom surface of the diffusion sheet.

In another aspect, there is provided a method for manufacturing an optical film, the method including: providing a polarizer, providing a diffusion sheet adhered to a bottom surface of the polarizer, the providing the diffusion sheet including: providing a first diffusion member, and providing a second diffusion member adhered to the first diffusion member, and providing a prism sheet adhered to a bottom surface of the diffusion sheet.

In another aspect, there is provided a liquid crystal display, including: a display panel, and an optical film adhered under the display panel, the optical film including: a polarizer, a diffusion sheet adhered to a bottom surface of the polarizer, the diffusion sheet including: a first diffusion member, and a second diffusion member adhered to the first diffusion member, and a prism sheet adhered to a bottom surface of the diffusion sheet.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments of the disclosure. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the disclosure.

Figure 1:
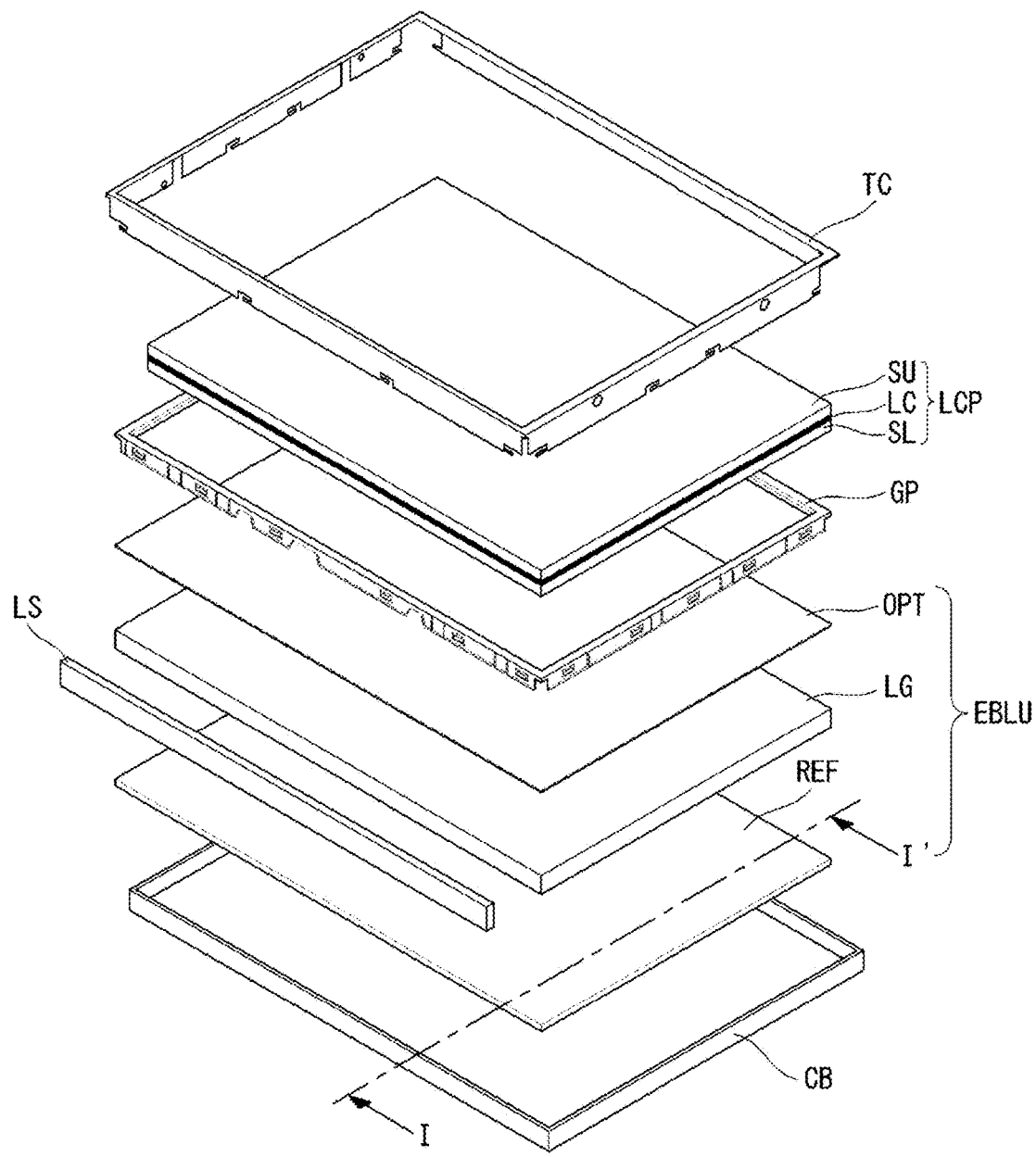
FIG. 1 is an exploded perspective view showing the structure of a liquid crystal display that includes an edge-type backlight unit according to a related art.
Figure 2:
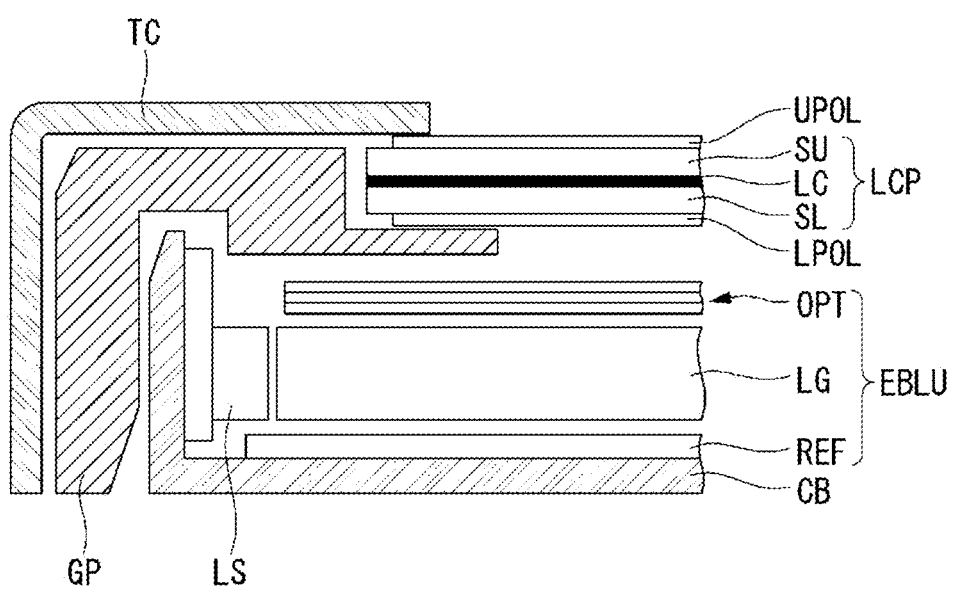
FIG. 2 is a cross-sectional view showing the structure of the liquid crystal display that includes an edge-type backlight unit according to the related art, taken along line I-I' of FIG. 1.
Figure 3:
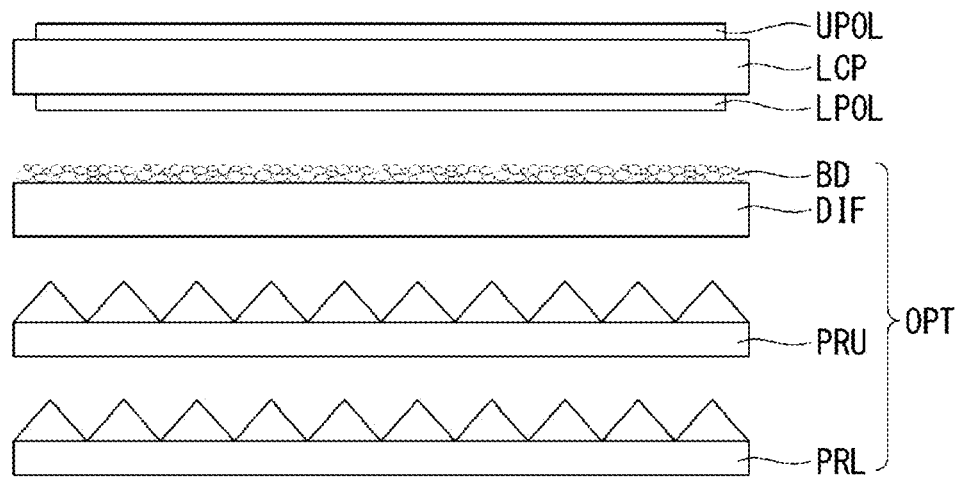
FIG. 3 is a cross-sectional view showing the structure of optical films including a diffusion film in a liquid crystal display according to a related art.
Figure 4:
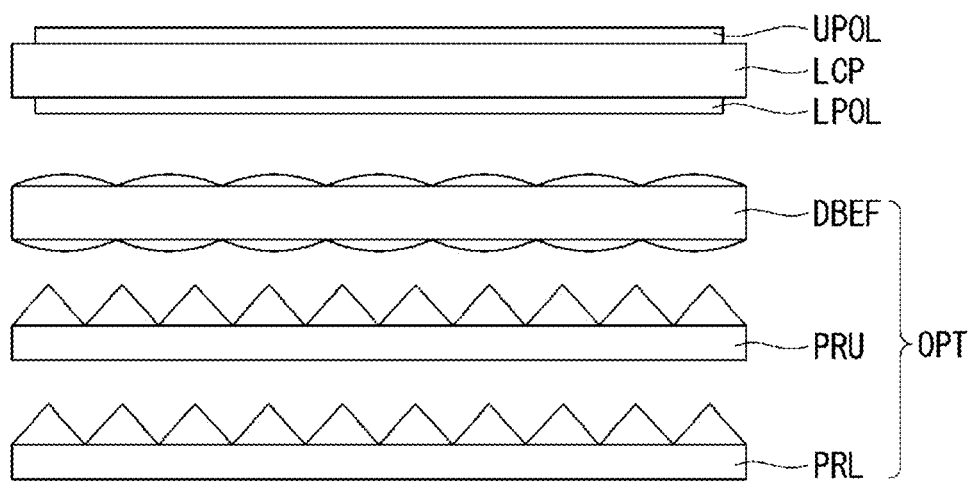
FIG. 4 is a cross-sectional view showing the structure of optical films, including a high brightness diffusion film, in a liquid crystal display according to a related art.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

<First Embodiment>

Figure 5:
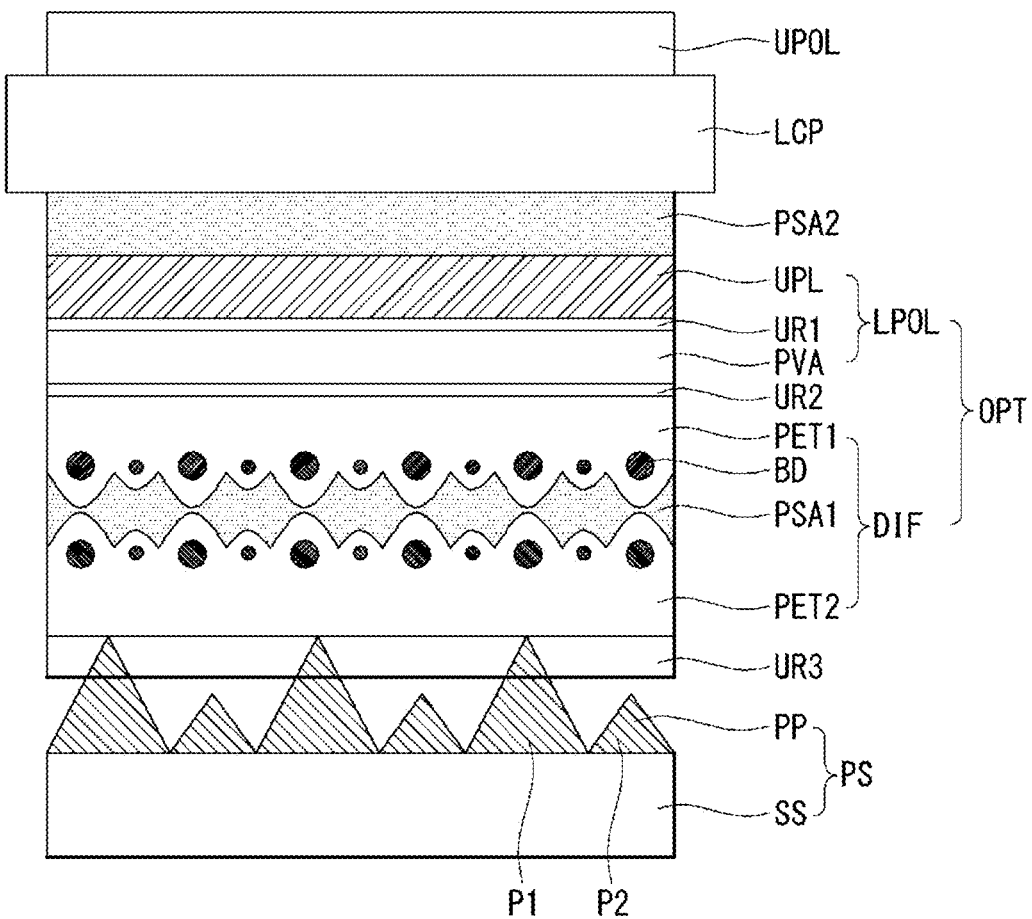
FIG. 5 is a cross-sectional view showing the structure of a liquid crystal display according to an embodiment of the present disclosure.
Figure 6:
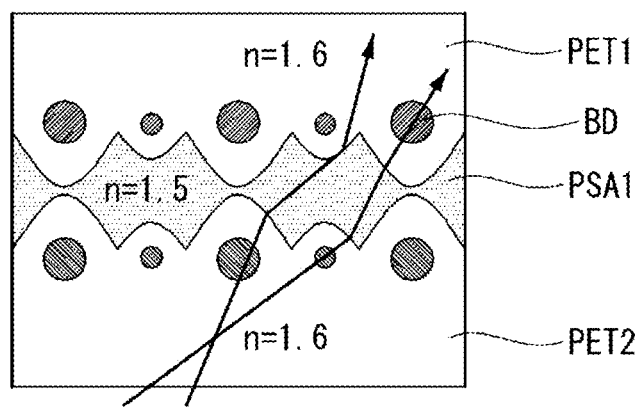
FIG. 6 is a cross-sectional view showing a portion of a liquid crystal display according to a first embodiment of the present disclosure.
Figure 7:
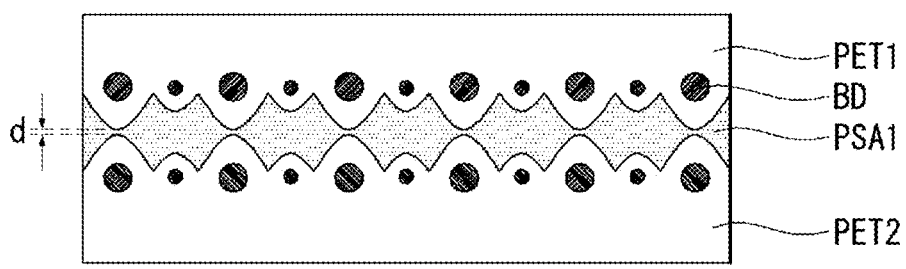
FIG. 7 is a cross-sectional view showing a diffusion sheet according to an embodiment of the present disclosure.

FIG. 5 is a cross-sectional view showing the structure of a liquid crystal display according to an embodiment of the present disclosure. FIG. 6 is a cross-sectional view showing some area of a liquid crystal display according to a first embodiment of the present disclosure. FIG. 7 is a cross-sectional view showing a diffusion sheet according to an embodiment of the present disclosure.

With reference to FIG. 5, the liquid crystal display (LCD) according to an embodiment of the present disclosure may include an LCD panel LCP, an upper polarizer UPOL, and an optical film OPT.

The LCD panel LCP may include an upper substrate and a lower substrate opposing each other with a liquid crystal layer interposed therebetween. The upper polarizer UPOL may be on a top surface of the LCD panel LCP. The lower polarizer LPOL may be on a bottom surface of the LCD panel LCP. The upper polarizer UPOL may have light transmission axes or light blocking axes aligned in a first direction. The lower polarizer LPOL may have light transmission axes or light blocking axes aligned in a second direction. If an LCD is normally black, the first light transmission axis and the second light transmission axis may be orthogonal to each other. In contrast, if an LCD is normally white, the first light transmission axis and the second light transmission axis may be disposed in parallel.

The optical film OPT may include the lower polarizer LPOL, a diffusion sheet DIF, and a prism sheet PS. The lower polarizer LPOL may include a core layer PVA and an upper protection layer UPL. The core layer PVA may polarize light and may be made of, e.g., polyvinyl alcohol (PVA). Depositing PVA formed by a depositing method or coating PVA formed by a coating method may be used as the core layer PVA, although embodiments are not limited thereto. The core layer PVA may be deformed by moisture included in the air. Accordingly, a protection layer may be positioned on at least one surface of the core layer PVA. In an embodiment of the present disclosure, the upper protection layer UPL may be on a top surface of the core layer PVA. The upper protection layer UPL may be made of, e.g., triacetatecellulose (TAC), acryl, polyethylene terephthalate (PET), polycarbonate (PC), or polyethylene naphthenate (PEN), although embodiments are not limited thereto. The upper protection layer UPL may adhere to the core layer PVA by a first ultraviolet (UV) adhesive layer UR1. Any appropriate transparent adhesives may be used as the first UV adhesive layer UR1.

In an embodiment of the present disclosure, the lower polarizer LPOL in the FIG. 5 example has been illustrated as having a structure including the core layer PVA and the upper protection layer UPL over the core layer PVA. However, the lower polarizer LPOL may further include a lower protection layer under the core layer PVA. The lower polarizer LPOL is not limited to a particular structure if a protection layer is positioned at least on one surface thereof.

The diffusion sheet DIF may distribute light passing through the prism sheet PS so that the light has a uniform brightness distribution over the entire surface of the LCD panel LCP. For example, in the case of the edge-type backlight unit, a side face on which a light source is positioned may be brighter than a side face that is opposite the side face on which a light source is positioned. Furthermore, in the case of the direct-type backlight unit, a portion in which a light source is positioned may be brighter than the surrounding portion of the light source. The diffusion sheet DIF may uniformly diffuse a brightness distribution of light that is not uniform over the entire surface of the LCD panel LCP.

For example, the diffusion sheet DIF may have a first diffusion member PET1 and a second diffusion member PET2 integrated and attached through a first adhesive layer PSA1. Each of the first diffusion member PET1 and the second diffusion member PET2 may include a plurality of beads BD.

The first diffusion member PET1 and the second diffusion member PET2 may transmit light incident from a light source, and may support the plurality of beads BD. To this end, the first diffusion member PET1 and the second diffusion member PET2 may be made of a material that is capable of transmitting light incident from the light source and that has a resistance force against moisture in the air, for example, polyethylene terephthalate (PET), polycarbonate (PC), polypropylene (PP), polyethylene (PE), polystyrene (PS), and/or polyepoxy (PE), but is not limited thereto. Each of the first diffusion member PET1 and the second diffusion member PET2 may be thin in accordance with the thinness of a backlight unit, for example, a thickness of 10 μm to 250 μm. If each of the first diffusion member PET1 and the second diffusion member PET2 has a thickness of 10 μm or more, the backlight unit can be made as thin as possible within the limits in which the mechanical physical and heat-resistant properties of the optical film are not deteriorated. Furthermore, if each of the first diffusion member PET1 and the second diffusion member PET2 has a thickness of 250 μm or less, the thinness of the backlight unit can be achieved and the mechanical physical and heat-resistant properties of the optical film can also be maximized.

Each of the first diffusion member PET1 and the second diffusion member PET2 may include the plurality of beads BD dispersed therein. The plurality of beads BD may be made of the same kind of resin as the first diffusion member PET1 and the second diffusion member PET2, or may be made of a resin that is different from that of the first diffusion member PET1 and the second diffusion member PET2. Each of the first diffusion member PET1 and the second diffusion member PET2 may include 10 to 50 weight % of the plurality of beads BD. The size of the beads BD may be properly selected depending on a thickness of each of the first diffusion member PET1 and the second diffusion member PET2, and may be, e.g., 1 μm to 10 μm. The beads BD may all have substantially the same size and may have a uniform distribution within each of the first diffusion member PET1 and the second diffusion member PET2. In some embodiments, the beads BD may have different sizes, and may have an irregular distribution within each of the first diffusion member PET1 and the second diffusion member PET2.

The first adhesive layer PSA1 may be positioned between the first diffusion member PET1 and the second diffusion member PET2 for adhesion between the first diffusion member PET1 and the second diffusion member PET2. The first adhesive layer PSA1 may attach the first diffusion member PET1 and the second diffusion member PET2 together. Any appropriate adhesives having high elasticity and a good adhesive characteristic and are capable of preventing peeling-off by reducing the generation of a fine bubble may be used as the first adhesive layer PSA1. For example, pressure sensitive adhesives (PSA), UV adhesives or non-solvent adhesives may be used as the first adhesive layer PSA1. Furthermore, the first adhesive layer PSA1 may function as an adhesive, and may also protect the sheets against an external impact because it has a particular elasticity. Furthermore, the first adhesive layer PSA1 may also have a diffusion characteristic because it includes a plurality of beads.

In an embodiment of the present disclosure, to improve the uniformity of light by diffusing light and to cover the underlying light source, each of the first diffusion member PET1 and second diffusion member PET2 of the diffusion sheet DIF, each including the plurality of beads BD, may have a haze characteristic of 10% to 50%. A total haze of the diffusion sheet DIF may be 20% to 100%.

Furthermore, the diffusion sheet DIF according to the present embodiment may diffuse light even if an air layer is not present between the lower polarizer LPOL and the diffusion sheet DIF. To this end, the first diffusion member PET1 and second diffusion member PET2 of the diffusion sheet DIF may have a refractive index of, e.g., 1.5 to 1.7, and the beads BD included in the first diffusion member PET1 and the second diffusion member PET2 may also have a refractive index of, e.g., 1.5 to 1.7. The first adhesive layer PSA1 between the first diffusion member PET1 and the second diffusion member PET2 may have a refractive index of, e.g., 1.4 to 1.6. In this case, the first diffusion member PET1 and the second diffusion member PET2 may have the same refractive index, but the first adhesive layer PSA1 may have a refractive index different from that of the first diffusion member PET1 and the second diffusion member PET2.

With reference to FIG. 6, light incident from the lower side of the second diffusion member PET2 to the second diffusion member PET2 may pass through the second diffusion member PET2. Because the second diffusion member PET2 and the first adhesive layer PSA1 may have different refractive indices, the light may be refracted at the interface of the second diffusion member PET2 and the first adhesive layer PSA1. Thus the path of the light may be changed. Because the path of the light may be changed, the light may be condensed (or focused) upward or may be diffused laterally. The light passing through the first adhesive layer PSA1 may be refracted again at the interface of the first diffusion member PET1 having a different refractive index, and then may be condensed or diffused. Accordingly, the diffusion sheet DIF according to an embodiment has an advantage in that it can attach the first diffusion member PET1 and the second diffusion member PET2, and may also diffuse light because the first adhesive layer PSA1 having a different refractive index may be formed between the first diffusion member PET1 and the second diffusion member PET2.

With reference to FIG. 7, the first diffusion member PET1 and second diffusion member PET2 of the diffusion sheet DIF according to an embodiment may be spaced apart from each other so that light incident from the lower side may be diffused. That is, the first diffusion member PET1 and the second diffusion member PET2 may not contact each other, and the first adhesive layer PSA1 may be disposed between them. As described above, light incident from the lower side to the diffusion sheet DIF may be refracted at the interface of the first adhesive layer PSA1 having a different refractive index from that of the first and the second diffusion members PET1 and PET2, and then may be diffused. To this end, the first adhesive layer PSA1 may be disposed between the first diffusion member PET1 and the second diffusion member PET2. If the first adhesive layer PSA1 is not present because the first diffusion member PET1 and the second diffusion member PET2 contact each other, the light may pass through the diffusion sheet DIF without a change of its path because the first diffusion member PET1 and the second diffusion member PET2 have the same refractive index. As a result, the light cannot be diffused in that case.

To solve such a problem, the distance between the first diffusion member PET1 and second diffusion member PET2 of the diffusion sheet DIF according to an embodiment may be, e.g., 0.1 to 20 μm. In this case, if the distance between the first diffusion member PET1 and the second diffusion member PET2 is 0.1 μm or more, light may be refracted at the interface of the first and the second diffusion members PET1 and PET2 and the first adhesive layer PSA1, and may be diffused. If the distance between the first diffusion member PET1 and the second diffusion member PET2 is 20 μm or less, thinness can be achieved because the thickness of the diffusion sheet DIF is decreased. The diffusion sheet DIF according to an embodiment may adhere to the lower polarizer LPOL through a second UV adhesive layer UR2.

With reference again to the FIG. 5 example, the prism sheet PS may include a prism portion PP having prism patterns formed on a base sheet SS. The base sheet SS may transmit light incident from the light source, and may protect the prism portion PP of the prism sheet PS. To this end, the base sheet SS may be made of a material that is capable of transmitting light incident from the light source and that has a resistance force against moisture in the air, for example, polyethylene terephthalate (PET), polycarbonate (PC), polypropylene (PP), polyethylene (PE), polystyrene (PS), and/or polyepoxy (PE), but is not limited thereto. The base sheet SS may be formed to have a thickness in accordance with the thinness of the backlight unit, for example, a thin thickness of 10 μm to 250 μm. If the base sheet SS has a thickness of 10 μm or more, the backlight unit can be made as thin as possible within the limits in which the mechanical physical and heat-resistant properties of the optical film are not deteriorated. Furthermore, if the base sheet SS has a thickness of 250 μm or less, the thinness of the backlight unit can be achieved and the mechanical physical and heat-resistant properties of the optical film can also be improved.

The prism portion PP may be disposed on the base sheet SS, and may condense light incident from the light source by the plurality of prism patterns. The prism portion PP may include a first prism pattern P1, having a first height, and a second prism pattern P2, having a second height. The first height and the second height may be different.

The LCD according to an embodiment of the present disclosure may have a structure in which the prism sheet PS has been laminated on the diffusion sheet DIF by a third UV adhesive layer UR3. For example, a portion of the plurality of prism patterns P1 and P2 of the prism portion PP formed in the prism sheet PS may be inserted into the third UV adhesive layer UR3. The first prism patterns P1 having the first height and the second prism patterns P2 having the second height may be alternately disposed in the prism sheet PS. Accordingly, a portion of a peak having a higher one of the first height and the second height may be inserted into the third UV adhesive layer UR3. For example, if the first height is greater than the second height, part of the first prism patterns P1 having the first height may be inserted into the third UV adhesive layer UR3.

As described above, although a portion of the at least one first prism pattern P1 may be inserted into the third UV adhesive layer UR3, the second prism patterns P2 may be spaced apart from the third UV adhesive layer UR3 at a specific interval. That is, an air layer may be interposed between the third UV adhesive layer UR3 and the second prism patterns P2. If the prism portion PP of the prism sheet PS does not include peaks having different heights, the size of the air layer may be significantly reduced. Thus, a light-condensing characteristic may be deteriorated because all the peaks of the prism portion PP would be inserted into the third UV adhesive layer UR3. As a result, brightness may be deteriorated because light may not be sufficiently refracted. Accordingly, in an embodiment of the present disclosure, the first prism patterns P1 and the second prism patterns P2 may have different heights. In an embodiment of the present disclosure, a sufficient air layer can be secured between the third UV adhesive layer UR3 and the second prism patterns P2 because the prism patterns P1 and P2 of the prism portion PP of the prism sheet PS may have different heights, thereby being capable of minimizing a brightness loss. As described above, the optical film OPT, in which the lower polarizer LPOL, the diffusion sheet DIF, and the prism sheet PS may have been laminated into one film, may adhere to the bottom surface of the LCD panel LCP by a second adhesive layer PSA2.

As described above, the LCD according to the first embodiment of the present disclosure has an advantage in that light incident from the lower side can be refracted at the interface of the first and the second diffusion member and the first adhesive layer and diffused because the first adhesive layer having a different refractive index is formed between the first diffusion member and the second diffusion member each including the plurality of beads. Furthermore, an embodiment of the present disclosure has advantages in that separate optical films can be omitted, the thickness of a backlight unit can be reduced, and the LCD can be made as thin as possible because the lower polarizer, the diffusion sheet, and the prism sheet have been integrated and are disposed under the LCD panel.

A method for fabricating the optical film according to the first embodiment of the present disclosure is described below.

FIGS. 8 to 13 are cross-sectional views showing a process for manufacturing an optical film according to a first embodiment of the present disclosure.

Figure 8:
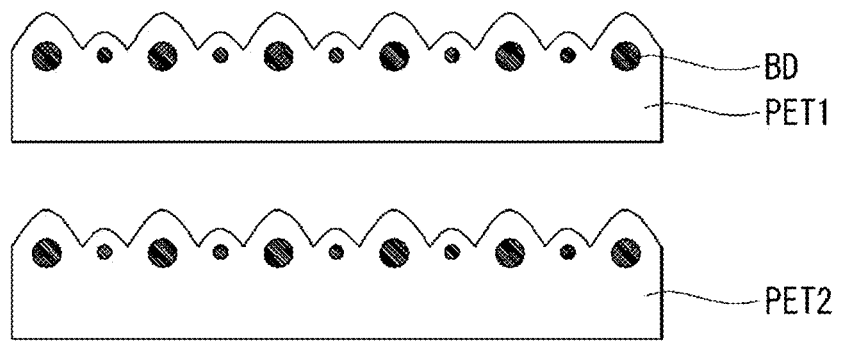
FIGS. 8 to 13 are cross-sectional views showing a process for manufacturing the optical film according to the first embodiment of the present disclosure.

With reference to FIG. 8, each of the first diffusion member PET1 and the second diffusion member PET2 may be fabricated by coating resin in which the beads BD have been mixed on a base film and curing them. In this case, the base film and the resin may be made of the same material, for example, polyethylene terephthalate, although embodiments are not limited thereto. The first diffusion member PET1 and the second diffusion member PET2 may be fabricated to have a refractive index of, e.g., 1.6 and may have a haze in the range of 10% to 50%.

Figure 9:
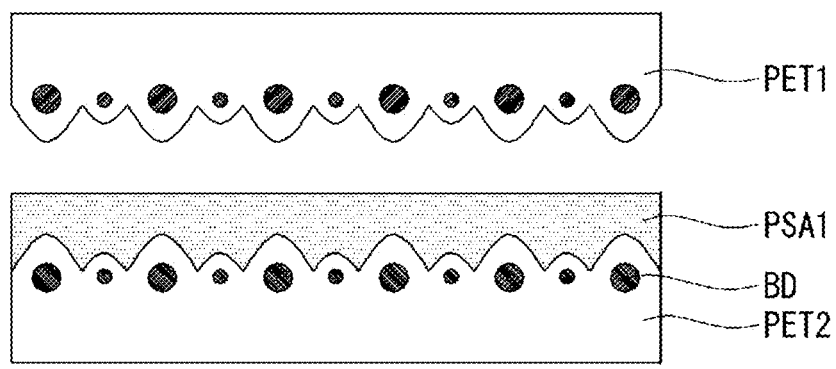

Next, with reference to FIG. 9, the first adhesive layer PSA1 may be coated on the second diffusion member PET2. In this case, the first adhesive layer PSA1 may be coated on an uneven surface of the second diffusion member PET2, the unevenness being caused the beads BD. Furthermore, the first adhesive layer PSA1 may be coated in a thickness of, e.g., 1 µm to 20 µm to secure an adhesive force so that the first diffusion member PET1 and the second diffusion member PET2 may be subsequently separated. Furthermore, the first adhesive layer PSA1 may be made of a material having a refractive index of, e.g., 1.5.

Figure 10:
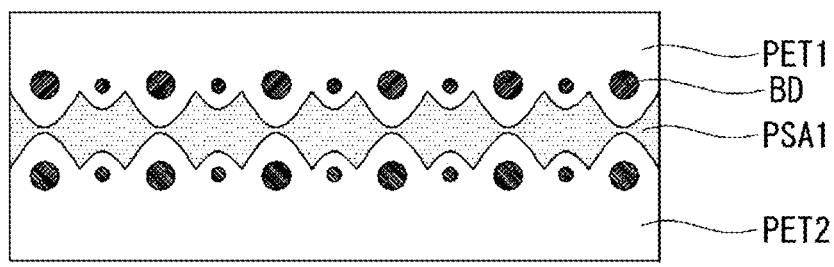

With reference to FIG. 10, an uneven surface of the first diffusion member PET1 (caused by the beads BD) may be disposed on the surface of the second diffusion member PET2, on which the first adhesive layer PSA1 of the second diffusion member PET2 may have been coated, so that the uneven surfaces face each other. Furthermore, the diffusion sheet DIF may be fabricated by laminating the first diffusion member PET1 and the second diffusion member PET2 together. The diffusion sheet DIF may have a final haze of 20% to 100% by controlling the respective hazes of the first diffusion member PET1 and the second diffusion member PET2.

Figure 11:
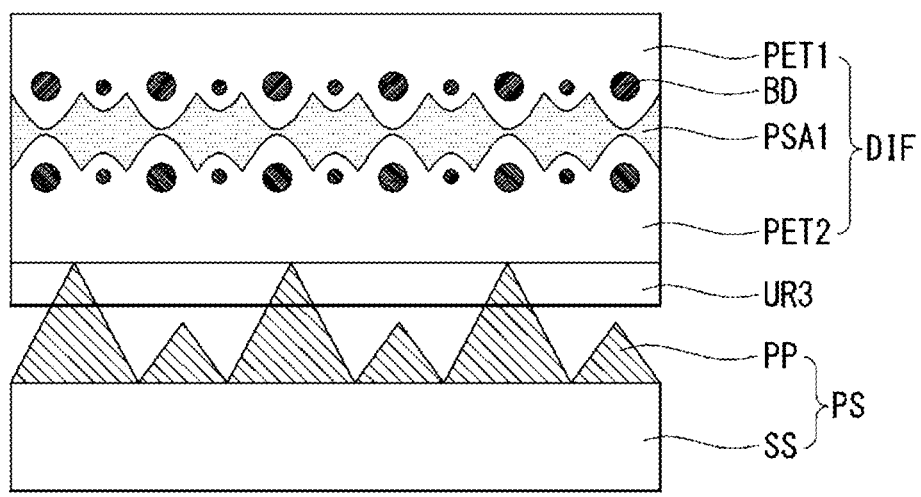

With reference to FIG. 11, the third adhesive layer UR3 may be coated on one surface of the fabricated diffusion sheet DIF, and the prism sheet PS may be laminated, and thus may be attached to the third UV adhesive layer UR3. The prism portion PP of the prism sheet PS may be inserted into the third UV adhesive layer UR3, and thus may adhere to the diffusion sheet DIF.

Figure 12:
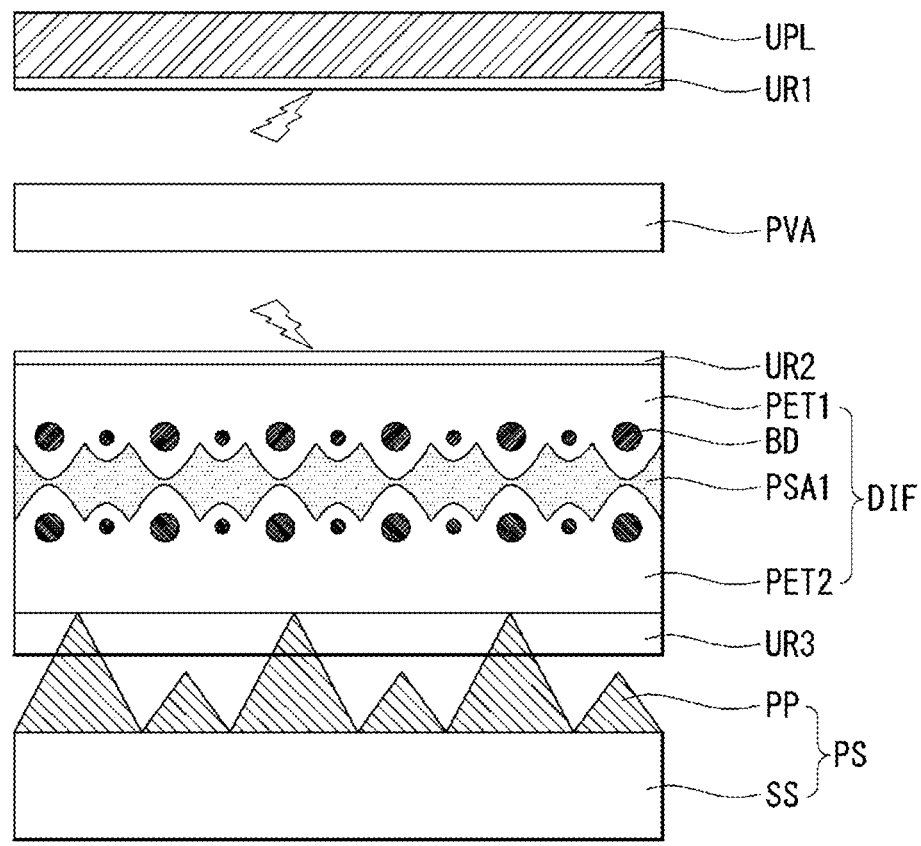

Next, with reference to FIG. 12, the first UV adhesive layer UR1 may be coated on the prepared upper protection layer UPL. The second UV adhesive layer UR2 may be coated on one surface of the fabricated diffusion sheet DIF. Furthermore, the first UV adhesive layer UR1 of the upper protection layer UPL and one surface of the core layer PVA may be disposed to face each other. The second UV adhesive layer UR2 of the diffusion sheet DIF and the other surface of the core layer PVA may be disposed to face each other.

Figure 13:
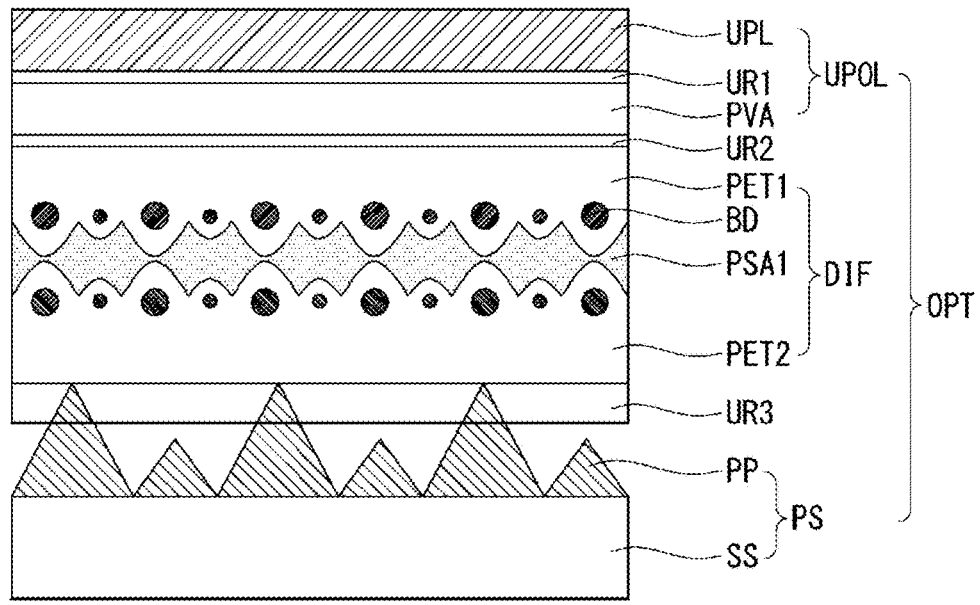

With reference to FIG. 13, the optical film OPT, in which the disposed upper protection layer UPL, core layer PVA, and diffusion sheet DIF have been integrated by laminating them at the same time, may be fabricated. The upper protection layer UPL may protect the top of the core layer PVA, and the diffusion sheet DIF, to which the prism sheet PS may have adhered, may protect the bottom of the core layer PVA. The optical film OPT fabricated as described above may be cut into a desired size, attached to the bottom surface of an LCD panel, and used.

<Second Embodiment>

Figure 14:
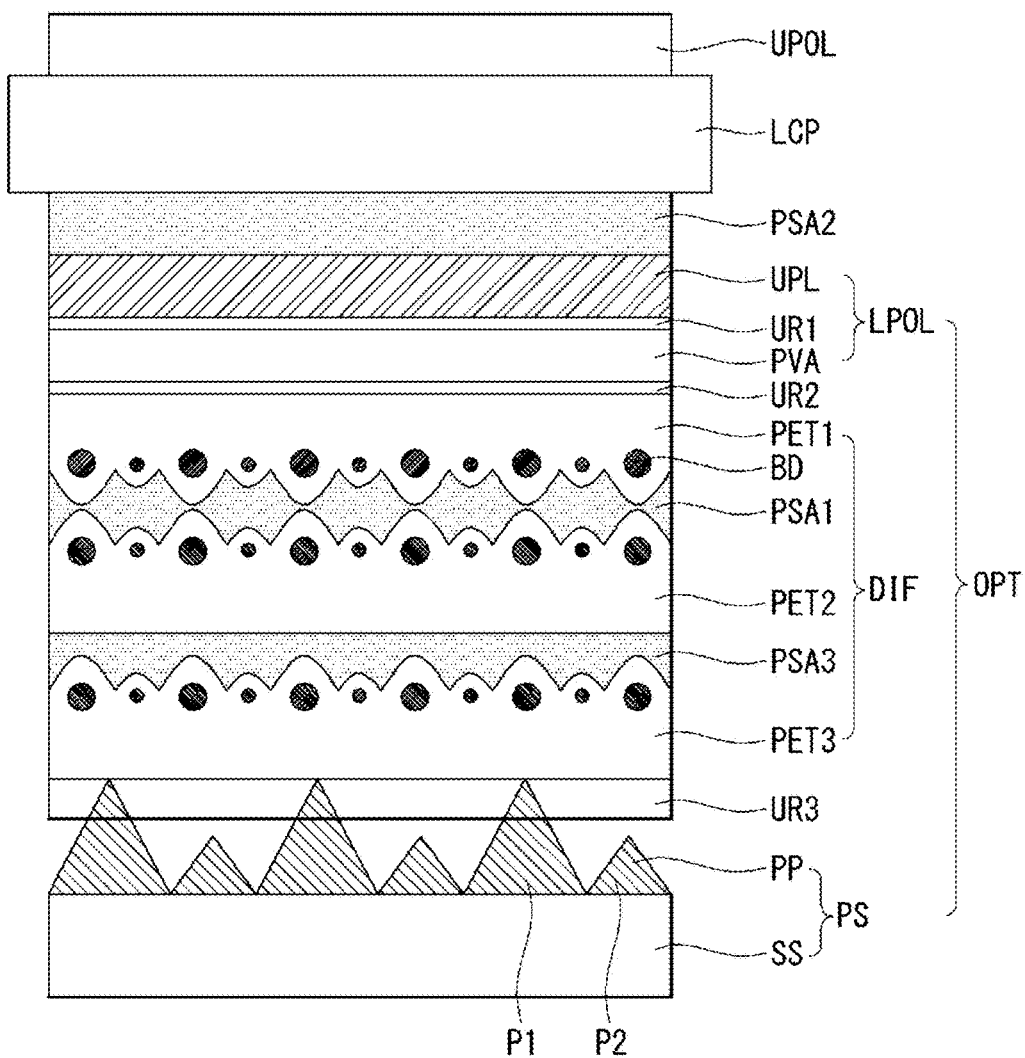
FIG. 14 is a cross-sectional view showing a liquid crystal display according to a second embodiment of the present disclosure.

An LCD according to a second embodiment of the present disclosure is described below with reference to FIG. 14. FIG. 14 is a cross-sectional view showing an LCD according to a second embodiment of the present disclosure.

With reference to FIG. 14, the LCD according to the second embodiment of the present disclosure may include an LCD panel LCP, an upper polarizer UPOL, and an optical film OPT. The optical film OPT may include a lower polarizer LPOL, a diffusion sheet DIF, and a prism sheet PS.

Unlike the LCD according to the first embodiment, the LCD according to the second embodiment further includes a third diffusion member PET3 adhered to the diffusion sheet DIF by a third adhesive layer PSA3. The remaining elements, such as the LCD panel LCP, the upper polarizer UPOL, the lower polarizer LPOL, and the prism sheet PS, are substantially similar to those of the first embodiment, and a detailed description thereof is omitted.

In the diffusion sheet DIF according to the present embodiment, the first diffusion member PET1 and the second diffusion member PET2 may adhere to each other through the first adhesive layer PSA1, and the second diffusion member PET2 and the third diffusion member PET3 may adhere to each other through the third adhesive layer PSA3. Each of the first diffusion member PET1, the second diffusion member PET2, and the third diffusion member PET3 may include a plurality of beads BD.

The third diffusion member PET3 may transmit light incident from a light source, and may support the plurality of beads BD. To this end, the third diffusion member PET3 may be made of the same material as the first diffusion member PET1 and the second diffusion member PET2. For example, the third diffusion member PET3 may be made of a material that is capable of transmitting light incident from the light source and that has a resistance force against moisture in the air, for example, polyethylene terephthalate (PET), polycarbonate (PC), polypropylene (PP), polyethylene (PE), polystyrene (PS), and/or polyepoxy (PE), but is not limited thereto. The third diffusion member PET3 may have a thickness in accordance with the thinness of the backlight unit, for example, a thin thickness of 10 µm to 250 µm. If the third diffusion member PET3 has a thickness of 10 µm or more, the backlight unit can be made as thin as possible within the limits in which the mechanical physical and heat-resistant properties of the optical film are not deteriorated. Furthermore, if the third diffusion member PET3 has a thickness of 250 µm or less, the thinness of the backlight unit can be achieved and the mechanical physical and heat-resistant properties of the optical film can also be maximized.

The third diffusion member PET3 may include the plurality of beads BD dispersed therein. The plurality of beads BD may be made of the same kind of resin as the third diffusion member PET3, or may be made of resin different from that of the third diffusion member PET3. The third diffusion member PET3 may include 10 to 50 weight % of the plurality of beads BD. The plurality of beads BD included in the third diffusion member PET3 may have the same configuration as the beads of the first diffusion member PET1 and the second diffusion member PET2, for example, the same material and size.

The third adhesive layer PSA3 may be positioned between the second diffusion member PET2 and the third diffusion member PET3 for adhesion between them. The third adhesive layer PSA3 may attach the second diffusion member PET2 and the third diffusion member PET3. Any appropriate adhesive having high elasticity and a good adhesive characteristic and that is capable of preventing being peeled off by reducing the generation of a fine bubble may be used as the third adhesive layer PSA3, e.g., acyclic copolymer. Furthermore, the third adhesive layer PSA3 may function as an adhesive, and may also protect the sheets against an external impact because it has specific elasticity. Furthermore, the third adhesive layer PSA3 may include the plurality of beads, and may also have a diffusion characteristic.

To improve the uniformity of light by diffusing light and to cover the underlying light source, in the diffusion sheet DIF according to the present embodiment, each of the first diffusion member PET1, the second diffusion member PET2, and the third diffusion member PET3, each including the plurality of beads BD, may have a haze characteristic of 10% to 50%. A total haze of the diffusion sheet DIF may be 20% to 100%. Furthermore, each of the first diffusion member PET1, the second diffusion member PET2, and the third diffusion member PET3 of the diffusion sheet DIF according to the present embodiment may have a refractive index of, e.g., 1.5 to 1.7. The beads BD included in each of the first diffusion member PET1, the second diffusion member PET2, and the third diffusion member PET3 may also have a refractive index of, e.g., 1.5 to 1.7. The third adhesive layer PSA3 may have a refractive index of, e.g., 1.4 to 1.6. In this case, the first diffusion member PET1, the second diffusion member PET2, and the third diffusion member PET3 may have the same refractive index, whereas the first adhesive layer PSA1 and the third adhesive layer PSA3 may have a refractive index different from that of the first diffusion member PET1, the second diffusion member PET2, and the third diffusion member PET3.

Accordingly, the diffusion sheet DIF according to the present embodiment has an advantage in that the first diffusion member PET1, the second diffusion member PET2, and the third diffusion member PET3 can adhere together, and light can be diffused because the first adhesive layer PSA1 having a different refractive index is formed between the first diffusion member PET1 and the second diffusion member PET2 and the third adhesive layer PSA3 having a different refractive index is formed between the second diffusion member PET2 and the third diffusion member PET3.

Furthermore, the second diffusion member PET2 and the third diffusion member PET3 of the diffusion sheet DIF according to the present embodiment may be spaced apart from each other so that light incident from the lower side is diffused. That is, the second diffusion member PET2 and the third diffusion member PET3 may not contact each other, and the third adhesive layer PSA3 may be positioned between them. As described above, light incident from the lower side to the diffusion sheet DIF may be refracted at the interface of the third adhesive layer PSA3 having a different refractive index from that of the second and the third diffusion members PET2 and PET3, and may be diffused. To this end, the third adhesive layer PSA3 may be between the second diffusion member PET2 and the third diffusion member PET3. Accordingly, the distance between the second diffusion member PET2 and third diffusion member PET3 of the diffusion sheet DIF according to the present embodiment may be, e.g., 0.1 μm to 20 μm.

As described above, the LCD according to the second embodiment of the present disclosure may include the first adhesive layer having a refractive index different from that of the first diffusion member and the second diffusion member between the first diffusion member and the second diffusion member, each including the plurality of beads, and the third adhesive layer having a refractive index different from that of the second diffusion member and the third diffusion member between the second diffusion member and the third diffusion member, each including the plurality of beads. Accordingly, there is an advantage in that light incident from the lower side can be refracted at the interface of the first diffusion member and the first adhesive layer, at the interface of the second diffusion member and the first adhesive layer, at the interface of the second diffusion member and the third adhesive layer, and at the interface of the third diffusion member and the third adhesive layer and diffused.

Furthermore, in an embodiment of the present disclosure, the lower polarizer, the diffusion sheet, and the prism sheet may have been integrated and are disposed under the LCD panel. Accordingly, there is an advantage in that the LCD can be made as thin as possible because separate optical films can be omitted and, therefore, the thickness of a backlight unit can be reduced.

Figure 15:
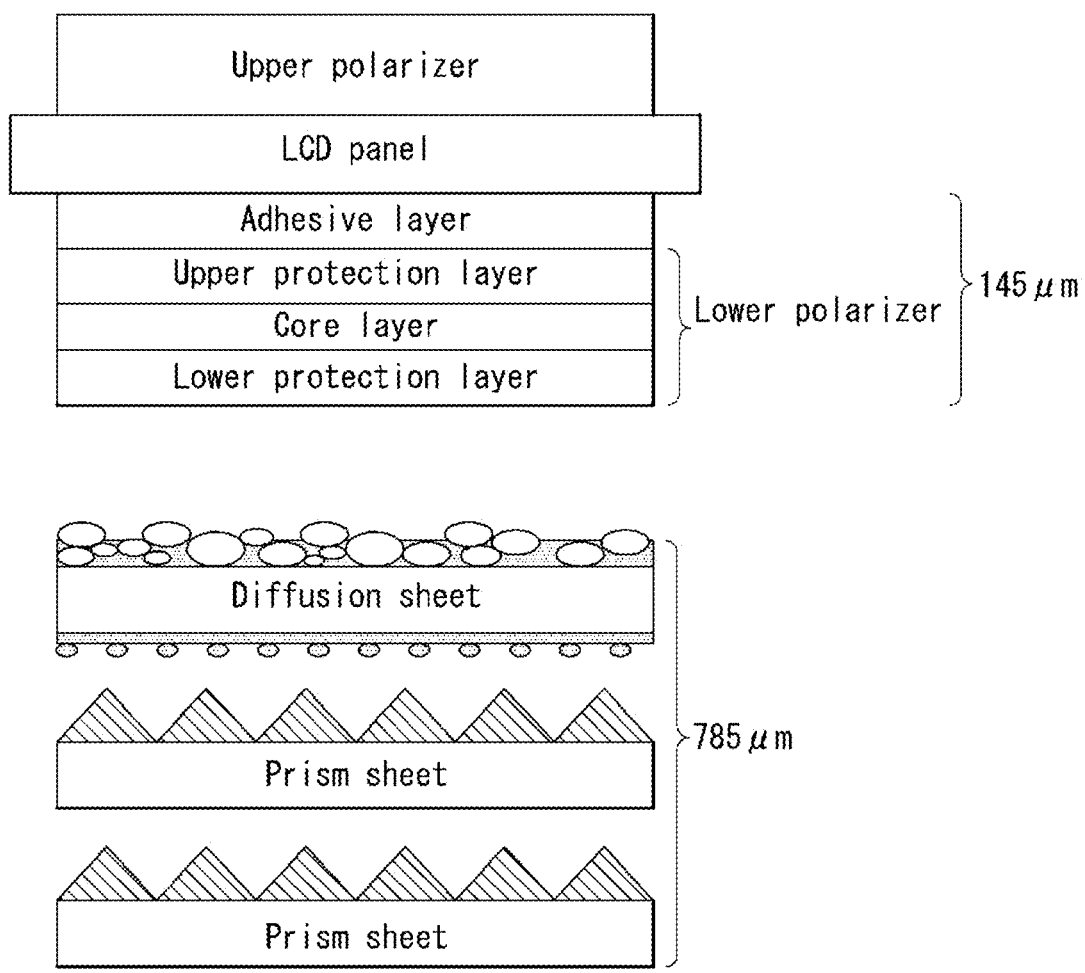
FIG. 15 is a cross-sectional view showing a liquid crystal display according to a comparative example 1.
Figure 16:
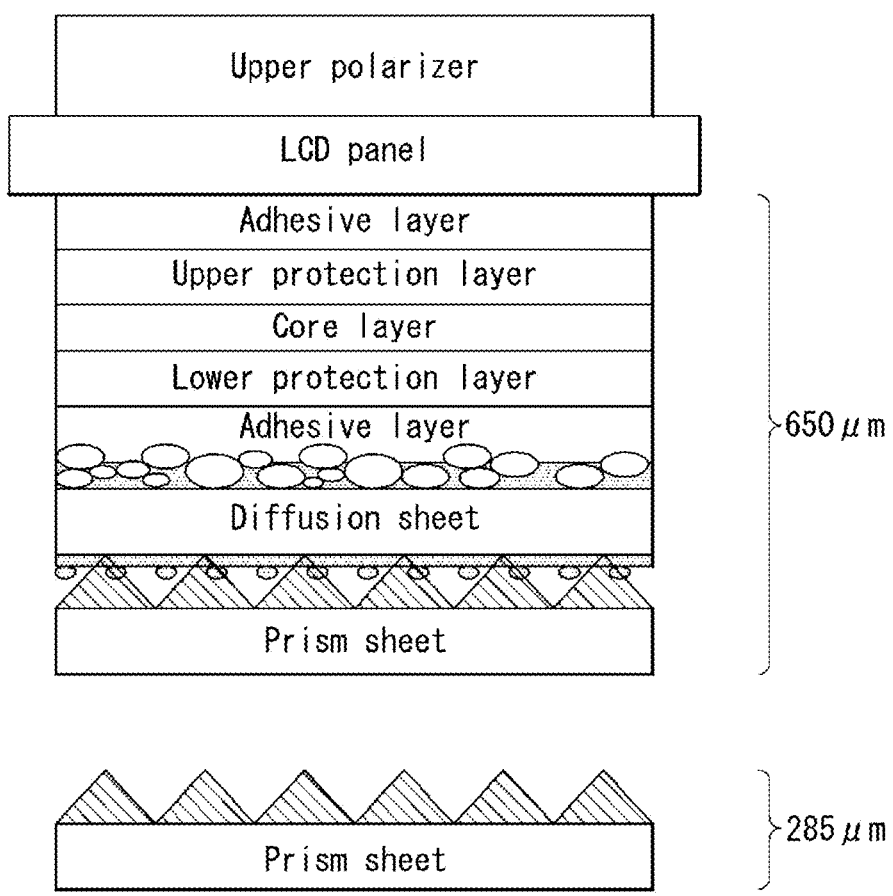
FIG. 16 is a cross-sectional view showing a liquid crystal display according to a comparative example 2.
Figure 17:
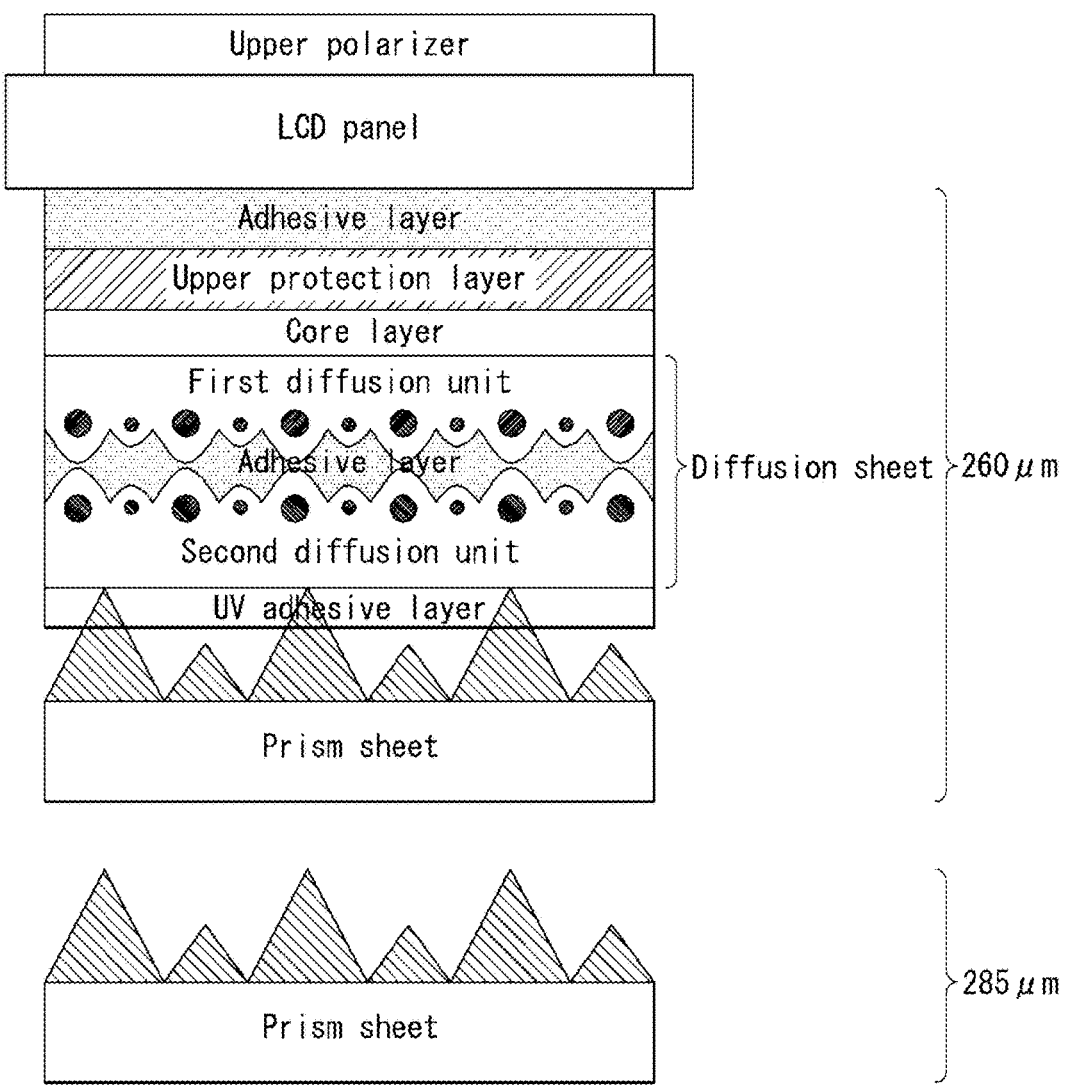
FIG. 17 is a cross-sectional view showing a liquid crystal display according to an embodiment of the present disclosure.
Figure 18:
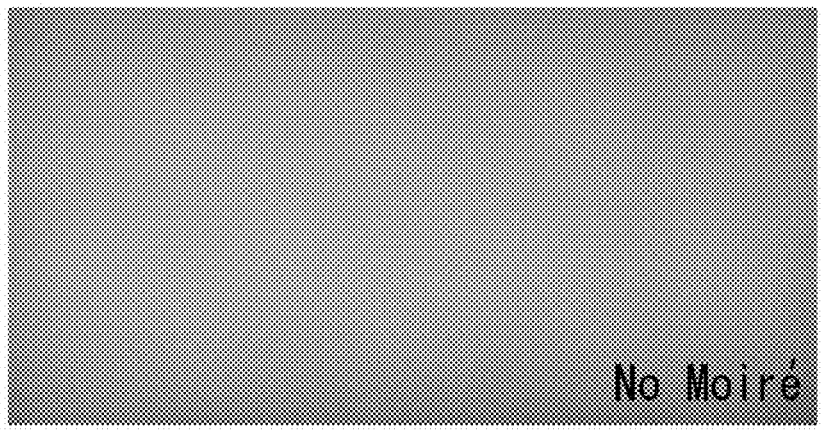
FIG. 18 shows a white image of the liquid crystal display according to the comparative example 1.
Figure 19:
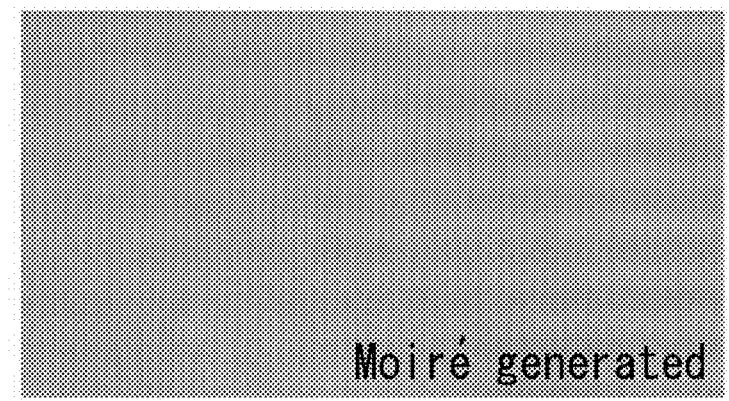
FIG. 19 shows a white image of the liquid crystal display according to the comparative example 2.
Figure 20:
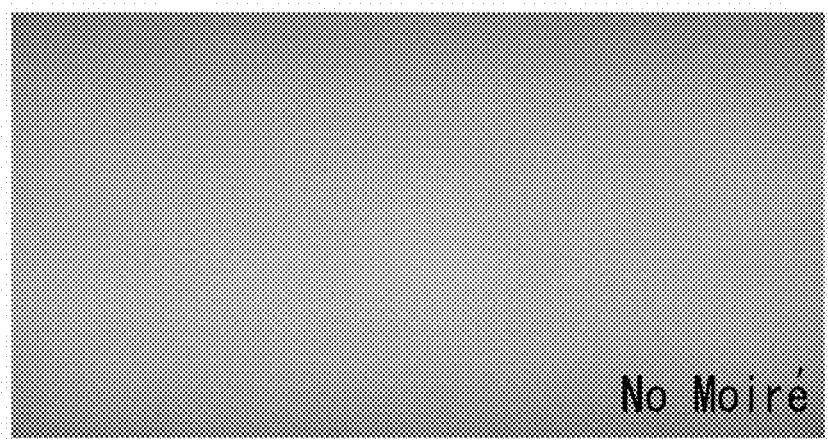
FIG. 20 shows a white image of the liquid crystal display according to an embodiment of the present disclosure.

Experimental data regarding the optical characteristics of LCDs according to comparative examples and the embodiments of the present disclosure are described below. FIG. 15 is a cross-sectional view showing an LCD according to a comparative example 1. FIG. 16 is a cross-sectional view showing an LCD according to a comparative example 2. FIG. 17 is a cross-sectional view showing an LCD according to an embodiment of the present disclosure. FIG. 18 shows a white image of the LCD according to the comparative example 1. FIG. 19 shows a white image of the LCD according to the comparative example 2. FIG. 20 shows a white image of the LCD according to an embodiment of the present disclosure.

With reference to FIG. 15, in the LCD according to the comparative example 1, an upper polarizer is positioned on the top surface of an LCD panel. A lower polarizer, to which an upper protection layer and a lower protection layer have been attached with a core layer interposed therebetween, is attached to the bottom surface of the LCD panel by an adhesive layer. A diffusion sheet and two prism sheets are positioned under the LCD panel, thereby forming the LCD.

With reference to FIG. 16, in the LCD according to the comparative example 2, an upper polarizer is positioned on the top surface of an LCD panel. A lower polarizer, to which an upper protection layer and a lower protection layer have been attached with a core layer interposed therebetween, is attached to the bottom surface of the LCD panel by an adhesive layer. A diffusion sheet is attached to the bottom surface of the lower polarizer by an adhesive layer. A first prism sheet is attached to the bottom surface of the diffusion sheet. A second prism sheet is spaced apart from the first prism sheet (in contrast to the FIG. 15 comparative example 1), thereby forming the LCD.

The LCD according to an embodiment of the present disclosure that is illustrated in the FIG. 17 example corresponds to the LCD of the FIG. 5 example.

FIG. 18 shows that in the LCD of the comparative example 1, an optical film under the LCD panel had a total thickness of 930 μm and a moiréphenomenon was not generated in a white image. FIG. 19 shows that in the LCD of the comparative example 2, an optical film under the LCD panel had a total thickness of 935 μm and a moiré phenomenon was generated in a white image. In contrast, FIG. 20 shows that in the LCD according to an embodiment of the present disclosure, the optical film under the LCD panel had a total thickness of 545 μm and a moiré phenomenon was not generated in a white image.

According to the results, the LCD according to an example embodiment of the present disclosure was 385 μm thinner than the comparative example 1 in which the diffusion sheet and the prism sheets have been separated. Furthermore, the LCD according to an example embodiment of the present disclosure does not generate a moiré phenomenon and was 390 µm thinner than the comparative example 2 in which the diffusion sheet and the prism sheet have been adhered together.

As described above, in the optical film according to an embodiment of the present disclosure, the diffusion sheet may be fabricated by forming the adhesive layer, having a refractive index different from that of the diffusion members, between the diffusion members including the plurality of beads. Accordingly, there is an advantage in that light incident from the lower side can be refracted at the interfaces of the diffusion members and at the interfaces of the adhesive layers and diffused.

Furthermore, the LCD according to an embodiment of the present disclosure has an advantage in that it can prevent a moiré phenomenon because the LCD may include the diffusion sheet, and may secure a haze of the diffusion sheet. Furthermore, in an embodiment of the present disclosure, the lower polarizer, the diffusion sheet, and the prism sheet may be integrated, and may be under the LCD panel. Accordingly, there is an advantage in that the LCD can be made as thin as possible because separate optical films can be omitted and the thickness of a backlight unit can be reduced.

It will be apparent to those skilled in the art that various modifications and variations may be made in the present disclosure without departing from the spirit or scope of the invention. Thus, it is intended that embodiments of the present disclosure cover the modifications and variations of this invention provided they come within the scope of the appended claims and their equivalents.

What is claimed is:

1. An optical film, comprising:
    a polarizer comprising a polyvinyl alcohol (PVA) core layer;
    an ultraviolet (UV) adhesive layer under a bottom surface of the PVA core layer;
    a diffusion sheet adhered to a bottom surface of the polarizer, the diffusion sheet comprising:
        a first diffusion member comprising a first convex portion, the first diffusion member being adhered to the UV adhesive layer such that the UV adhesive layer is between and directly contacts both of the PVA core layer and the first diffusion member;
        a second diffusion member adhered to the first diffusion member, the second diffusion member comprising a second convex portion; and
        a first adhesive layer between the first diffusion member and the second diffusion member, the first diffusion member and the second diffusion member being adhered together by the first adhesive layer, the first diffusion member and the second diffusion member contacting the same first adhesive layer; and
    a prism sheet adhered to a bottom surface of the diffusion sheet, the prism sheet comprising:
        a first prism pattern having a plurality of points at a first height; and
        a second prism pattern having a plurality of points at a second height less than the first height, at least one of the plurality of points of the second prism pattern being between at least two of the plurality of points of the first prism pattern.

2. The optical film of claim 1, wherein the first diffusion member and the second diffusion member are spaced apart from each other.

3. The optical film of claim 2, wherein a distance between the first diffusion member and the second diffusion member is 0.1 µm to 20 µm.

4. The optical film of claim 1, wherein each of the first diffusion member and the second diffusion member further comprises a plurality of beads.

5. The optical film of claim 4, wherein:
    each of the first diffusion member and the second diffusion member further comprises an uneven surface attributable to the plurality of beads; and
    the uneven surface of the first diffusion member and the uneven surface of the second diffusion member face each other.

6. The optical film of claim 1, wherein each of the first diffusion member and the second diffusion member has a refractive index of 1.5 to 1.7.

7. The optical film of claim 1, wherein the adhesive layer has a refractive index of 1.4 to 1.6.

8. The optical film of claim 1, wherein a refractive index of each of the first diffusion member and the second diffusion member is different from a refractive index of the adhesive layer.

9. The optical film of claim 1, further comprising a third diffusion member adhered to a bottom surface of the second diffusion member.

10. The optical film of claim 9, wherein:
    the third diffusion member further comprises a third convex portion formed by a plurality of beads; and
    a convex direction of the third convex portion is the same as a convex direction of the second convex portion of the second diffusion member adjacent to the third diffusion member.

11. The optical film of claim 9, further comprising:
    a second adhesive layer between the second diffusion member and the third diffusion member,
    wherein an interface between the second adhesive layer and the second diffusion member is flat.

12. A method for manufacturing an optical film, the method comprising:
    providing a polarizer comprising a polyvinyl alcohol (PVA) core layer;
    providing an ultraviolet (UV) adhesive layer under a bottom surface of the PVA core layer;
    providing a diffusion sheet adhered to a bottom surface of the polarizer, the providing the diffusion sheet comprising:
        providing a first diffusion member comprising a first convex portion, the first diffusion member being adhered to the UV adhesive layer such that the UV adhesive layer is between and directly contacts both of the PVA core layer and the first diffusion member;
        providing a second diffusion member adhered to the first diffusion member, the second diffusion member comprising a second convex portion; and
        providing a first adhesive layer between the first diffusion member and the second diffusion member, the first diffusion member and the second diffusion member being adhered together by the first adhesive layer, the first diffusion member and the second diffusion member contacting the same first adhesive layer; and
    providing a prism sheet adhered to a bottom surface of the diffusion sheet, the providing the prism sheet comprising:
        providing a first prism pattern having a plurality of points at a first height; and
        providing a second prism pattern having a plurality of points at a second height less than the first height, at least one of the plurality of points of the second prism pattern being between at least two of the plurality of points of the first prism pattern.

13. The method of claim 12, wherein the first diffusion member and the second diffusion member are spaced apart from each other.

14. The method of claim 13, wherein a distance between the first diffusion member and the second diffusion member is 0.1 µm to 20 µm.

15. The method of claim 12, wherein the providing each of the first diffusion member and the second diffusion member further comprises providing a plurality of beads.

16. The method of claim 15, wherein:
the providing each of the first diffusion member and the second diffusion member further comprises providing an uneven surface attributable to the plurality of beads; and
the uneven surface of the first diffusion member and the uneven surface of the second diffusion member face each other.

17. The method of claim 12, wherein:
each of the first diffusion member and the second diffusion member has a refractive index of 1.5 to 1.7; and
the adhesive layer has a refractive index of 1.4 to 1.6.

18. The method of claim 12, wherein a refractive index of each of the first diffusion member and the second diffusion member is different from a refractive index of the adhesive layer.

19. The method of claim 12, further comprising providing a third diffusion member adhered to a bottom surface of the second diffusion member, the third diffusion member comprising a third convex portion.

20. A liquid crystal display, comprising:
a display panel; and
an optical film adhered under the display panel, the optical film comprising:
a polarizer comprising a polyvinyl alcohol (PVA) core layer;
an ultraviolet (UV) adhesive layer under a bottom surface of the PVA core layer;
a diffusion sheet adhered to a bottom surface of the polarizer, the diffusion sheet comprising:
a first diffusion member comprising a first convex portion, the first diffusion member being adhered to the UV adhesive layer such that the UV adhesive layer is between and directly contacts both of the PVA core layer and the first diffusion member;
a second diffusion member adhered to the first diffusion member, the second diffusion member comprising a second convex portion; and
a first adhesive layer between the first diffusion member and the second diffusion member, the first diffusion member and the second diffusion member being adhered together by the first adhesive layer, the first diffusion member and the second diffusion member contacting the same first adhesive layer; and
a prism sheet adhered to a bottom surface of the diffusion sheet, the prism sheet comprising:
a first prism pattern having a plurality of points at a first height; and
a second prism pattern having a plurality of points at a second height less than the first height, at least one of the plurality of points of the second prism pattern being between at least two of the plurality of points of the first prism pattern.

21. The optical film of claim 10, wherein a convex direction of the first convex portion is opposite to the convex direction of the second convex portion, the convex direction of the third convex portion, and a convex direction of the first prism pattern of the prism sheet.

22. The method of claim 19, wherein a convex direction of the first convex portion of the first diffusion member is opposite to a convex direction of the second convex portion of the second diffusion member, a convex direction of the third convex portion of the third diffusion member, and a convex direction of the first prism pattern of the prism sheet.

23. The liquid crystal display of claim 20, further comprising:
a third diffusion member adhered to a bottom surface of the second diffusion member,
wherein a convex direction of the first convex portion of the first diffusion member is opposite to a convex direction of the second convex portion of the second diffusion member, a convex direction of the third convex portion of the third diffusion member, and a convex direction of the first prism pattern of the prism sheet.

* * * * *